United States Patent
Bender

(10) Patent No.: US 8,686,583 B2
(45) Date of Patent: Apr. 1, 2014

(54) OCEAN WAVE-POWERED ELECTRIC GENERATOR

(76) Inventor: Andrew L. Bender, Ambler, PA (US)

( * ) Notice: Subject to any disclaimer, the term of this patent is extended or adjusted under 35 U.S.C. 154(b) by 307 days.

(21) Appl. No.: 12/698,779

(22) Filed: Feb. 2, 2010

(65) Prior Publication Data

US 2010/0207392 A1     Aug. 19, 2010

Related U.S. Application Data

(60) Provisional application No. 61/207,865, filed on Feb. 2, 2009.

(51) Int. Cl.
*F03B 13/00* (2006.01)

(52) U.S. Cl.
USPC .................................................. 290/53

(58) Field of Classification Search
USPC ........................................................ 290/53
See application file for complete search history.

(56) References Cited

U.S. PATENT DOCUMENTS

| | | | | |
|---|---|---|---|---|
| 987,685 | A | * | 3/1911 | Atkinson ................. 60/507 |
| 1,184,362 | A | * | 5/1916 | Lindquist ................. 60/501 |
| 2,465,006 | A | * | 3/1949 | Bowes et al. ............. 310/102 R |
| 3,567,953 | A | * | 3/1971 | Lord ........................ 290/42 |
| 3,818,704 | A | * | 6/1974 | Lapeyre ................... 60/504 |
| 4,159,427 | A | * | 6/1979 | Wiedemann ............ 290/55 |
| 4,208,877 | A | | 6/1980 | Evans et al. |
| 4,228,360 | A | | 10/1980 | Navarro |
| 4,242,593 | A | | 12/1980 | Quilico et al. |
| 4,340,821 | A | | 7/1982 | Slonim |
| 4,355,511 | A | * | 10/1982 | Jones ...................... 60/507 |
| 4,520,273 | A | | 5/1985 | Rowe |
| 4,551,066 | A | | 11/1985 | Frisz |
| 4,717,831 | A | | 1/1988 | Kikuchi |
| 4,850,190 | A | | 7/1989 | Pitts |
| 5,066,867 | A | | 11/1991 | Shim |
| 5,176,552 | A | * | 1/1993 | Kuboyama et al. ...... 441/16 |
| 5,424,582 | A | | 6/1995 | Trepl, II et al. |
| 5,929,531 | A | * | 7/1999 | Lagno ..................... 290/53 |
| 6,389,810 | B1 | * | 5/2002 | Nakomcic ............... 60/502 |
| 6,531,788 | B2 | | 3/2003 | Robson |
| 6,695,535 | B1 | | 2/2004 | Lazes |
| 6,695,536 | B2 | | 2/2004 | Sanchez Gomez |
| 6,791,205 | B2 | | 9/2004 | Woodbridge |
| 7,245,041 | B1 | | 7/2007 | Olson |
| 7,305,823 | B2 | * | 12/2007 | Stewart et al. ............ 60/495 |
| 7,319,278 | B2 | | 1/2008 | Gehring |
| 7,536,859 | B2 | * | 5/2009 | Tai et al. ................... 60/497 |
| 2008/0054640 | A1 | * | 3/2008 | Olson ...................... 290/42 |
| 2009/0072540 | A1 | * | 3/2009 | McCague et al. ........ 290/53 |

FOREIGN PATENT DOCUMENTS

| | | | | |
|---|---|---|---|---|
| FR | 2311234 | A | * | 1/1977 |
| GB | 2480337 | A | * | 11/2011 |
| WO | WO 0196738 | A1 | * | 12/2001 |

* cited by examiner

*Primary Examiner* — Joseph Waks
(74) *Attorney, Agent, or Firm* — Fox Rothschild LLP

(57) ABSTRACT

Provided is a power generating device that includes a weight suspended from a buoy via a zip-line and at least two gears disposed on said zip-line which are coupled to a drive shafts, which in turn are coupled to an electric generator. The device converts the mechanical power of oscillating ocean waves into electricity.

11 Claims, 4 Drawing Sheets

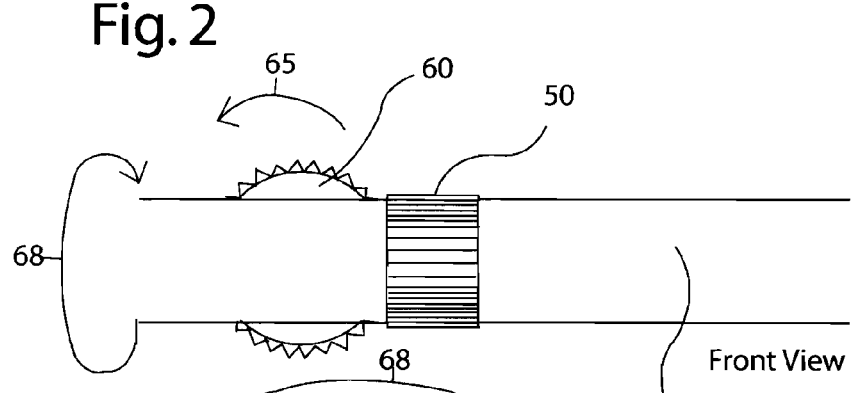
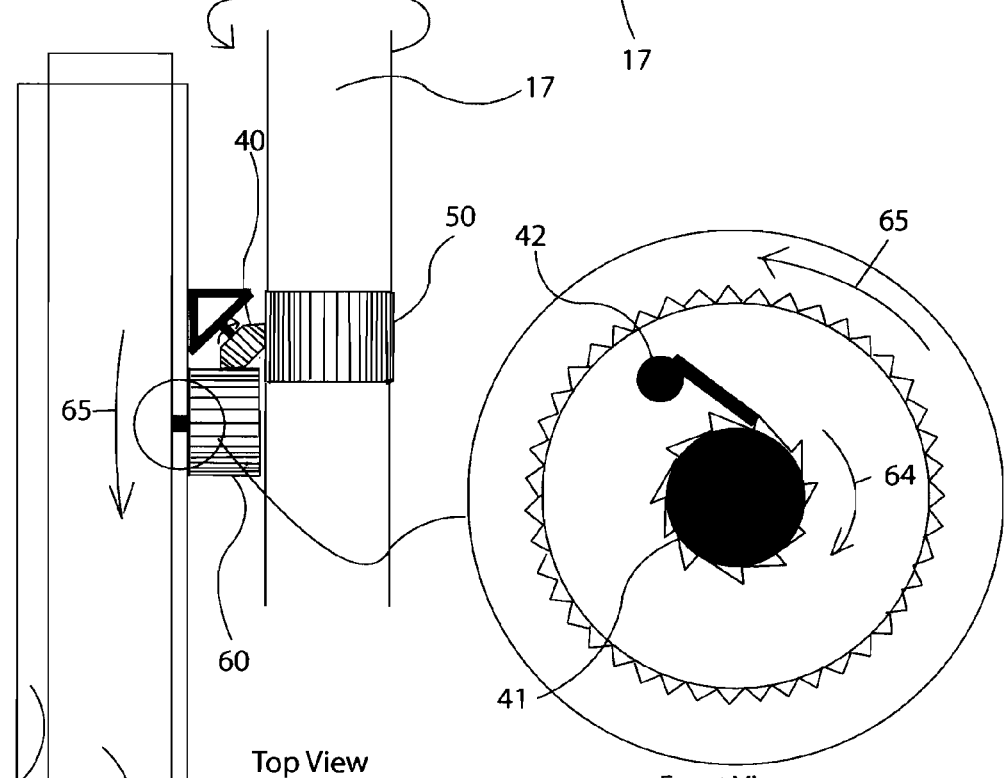

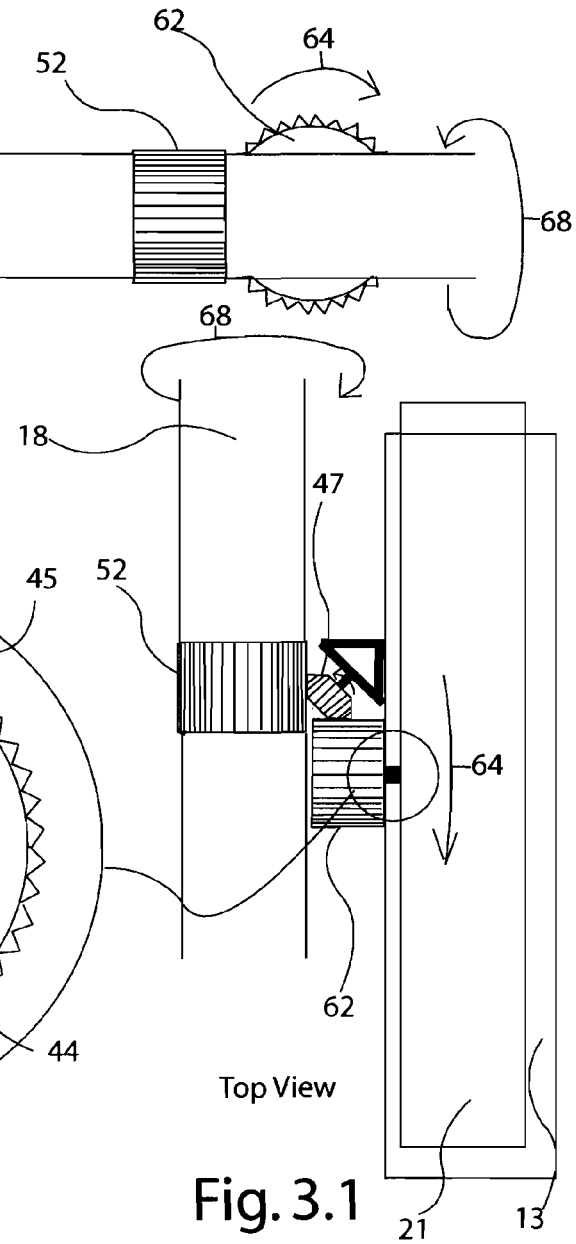

OCEAN WAVE-POWERED ELECTRIC GENERATOR

CROSS-REFERENCE TO RELATED APPLICATIONS

This application claims the priority benefit of U.S. Provisional Application No. 61/207,865, filed Feb. 2, 2009, which is incorporated herein by reference.

BACKGROUND

1. Field of Invention:

The present invention related to power generation. More particularly, the invention related to electricity generated by the oscillation of ocean waves.

2. Description of Prior Art:

Electricity is commercially typically generated by turbines driven by steam. Sources of heat to produce this steam include burning fossil fuels and nuclear fusion. However, both of these methods of producing electricity involve environmental risks. Consequently, there is a need for renewable, pollution free alternatives to fossil and nuclear fuels.

One such method is the use of ocean waves. More particularly, it is known to convert the mechanically energy of oscillating ocean waves into electricity via an electric generator. For example, U.S. Pat. Nos. 7,319,278, 5,066,867, 7,245,041, 6,695,535, 4,340,821, 4,242,593, 4,228,360, and U.S. Application No. 2004/0061338 disclose methods of converting ocean wave power into electricity. However, each of these methods rely on a drive means are easily damaged due to corrosion and/or the build-up of large amounts of residue due to biological forces. Accordingly, there remains a need for methods of converting ocean wave power into electricity that do are not prone to such damage. The present invention satisfies this need among others.

SUMMARY OF THE INVENTION

Applicant has discovered a method for converting ocean wave power into electricity that utilizes a weight suspended from a buoy via a zip-line, wherein the zip-line is coupled to a gear that drives an electric generator. The zip-line has a plurality of teeth, and as the buoy rises and falls with the ocean waves, the teeth of the zip-line pass mesh with and rotate the gear. Any residue that might start accumulating on the zip-line or gear will be constantly scraped off, and thus removed, by the meshing of the teeth of the zip-line with teeth of the gear as the buoy rises and falls. In addition, other methods become less efficient over time due to residue build-up, or only use half the available energy, unlike the development which uses all available wave energy.

Accordingly, provided is a power generator comprising: (a) a buoy disposed at the surface of an ocean; (b) a weight disposed in said ocean; (c) an electric generator comprising a stator and a rotor; (d) a zip-line having a first end, a second end, and a plurality of line-teeth disposed in series between said first and second ends, wherein said first end of the zip-line is attached to said buoy and the second end of the zip-line is attached to said weight, wherein said weight is suspended below said buoy; (e) a first gear disposed vertically between said buoy and said weight, said first gear comprising a first set of annularly disposed drive-teeth, wherein said first set of drive-teeth are mechanically meshed with said line-teeth, and a first ratchet disposed to allow said first set of drive-teeth to rotate in a first direction; (f) a first drive mechanism comprising a first drive shaft having a first end coupled to said rotor and a second end coupled to said first gear; (g) a second gear disposed vertically between said first gear and said weight, said second gear comprising a second set of annularly disposed drive-teeth, wherein said second set of drive-teeth are mechanically meshed with said line-teeth, and a second ratchet disposed to allow said second set of drive-teeth to rotate in a second direction, said second direction being opposite of said first direction; and (h) a second drive mechanism comprising a second drive shaft having a first end coupled to said rotor and a second end coupled to said second gear.

BRIEF DESCRIPTION OF THE DRAWINGS

FIG. 2 shows a detail of a zip-line and gear coupling according in the power generator of FIG. 1;

FIG. 2.1 shows a detail of a zip-line and gear coupling according in the power generator of FIG. 1;

FIG. 2.2 shows a detail of a zip-line and gear coupling according in the power generator of FIG. 1;

FIG. 3 shows a detail of a zip-line and gear coupling according in the power generator of FIG. 1;

FIG. 3.1 shows a detail of a zip-line and gear coupling according in the power generator of FIG. 1;

FIG. 3.2 shows a detail of a zip-line and gear coupling according in the power generator of FIG. 1.

DETAILED DESCRIPTION OF PREFERRED EMBODIMENTS OF THE INVENTION

The electric generator of the present invention takes advantage of both the rise and fall of waves to drive a generator to produce electricity.

Figure 1:
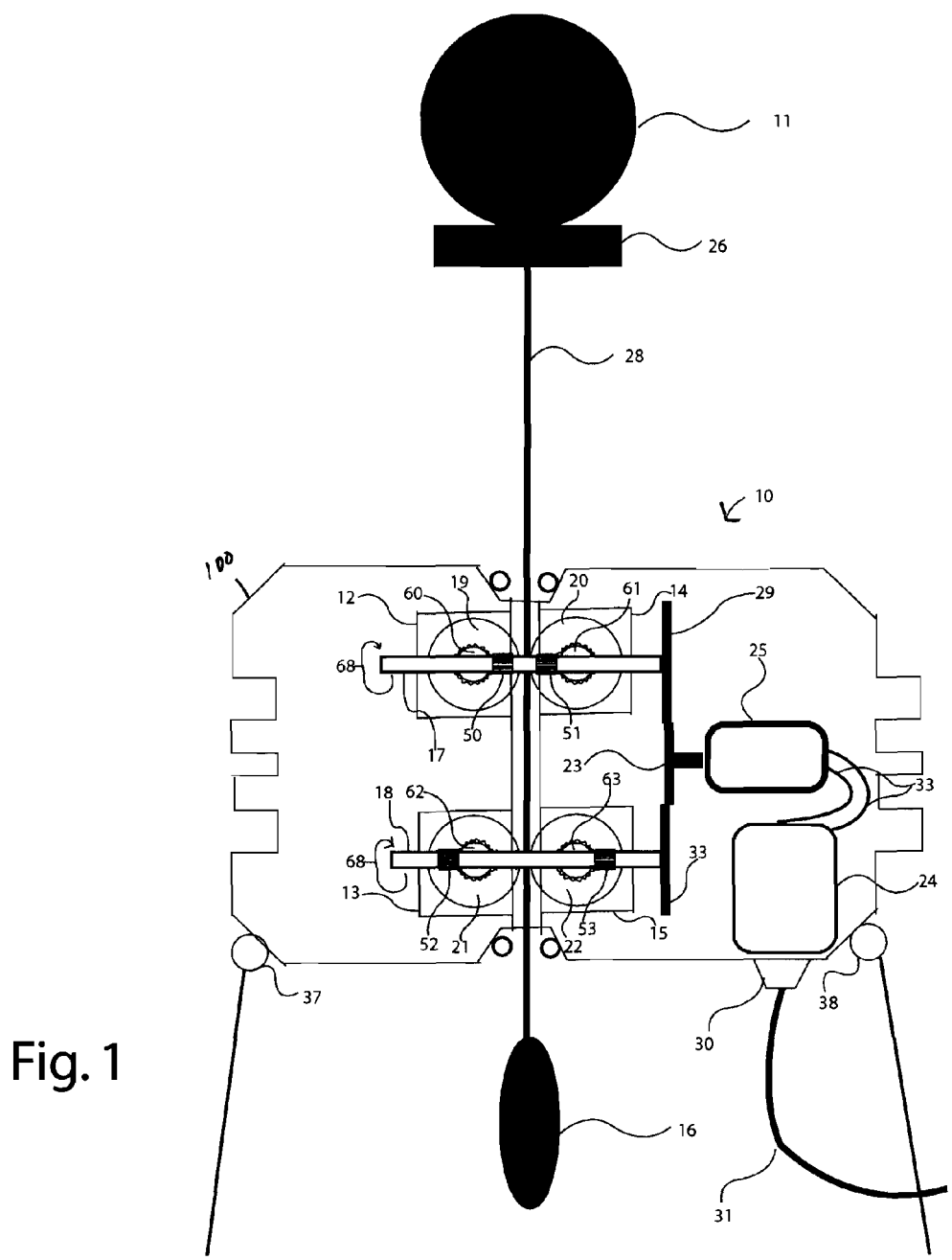
FIG. 1 shows a power generator according to a preferred embodiment of the invention.

Turning to FIG. 1, shown is a front inside view of the power generating device 10. The device 10 comprises a buoy 11, preferably constructed of a material that resists puncture such as a closed-cell foam. A weight 16 is suspended below the buoy. A zip-line 28 passes through a housing 100, preferably a water-tight housing, that contains an electric generator 25 and gears 19, 20, 21, and 22, which disposed in waterproof housing 12, 13, 14, and 15. As the buoy rises and falls with an ocean wave, the gears turn. As the buoy rises, only gears 19 and 20 and gears 60, 61, 50, 51, 40, and 47 (see FIGS. 2 and 3), turn due to ratchets 42 and 45 which allows only one direction of rotation. The rotation of the gears rotates shaft 17 is direction 68 which rotates gears 29 and 23, turning the generator's rotor to produce electricity. As the zip-line lowers, the gears 62, 63, 52, 53, 40, and 47 of gears 21 and 22 turn, rotating shaft 18 in direction 68 which rotates gears 23 and 33 rotating generator 25 to continue producing electricity. The electrical current travels through wires 33 to the optional flywheel 24. As needed, the flywheel 24 turns the flywheel's momentum into electricity which exits the device via port 30 and cable 31.

FIGS. 2, 2.1, and 2.2 show a detail view of gear 19 which rotates in direction 65 and turns gears 40, 50, and 60, thus rotating shaft 17 which turns in direction 68. The one-way ratchet 41 prevents gear 19 from rotating shaft 17 when turned in direction 64.

FIGS. 3, 3.1, and 3.2 show a detailed view of gear 21 which rotates in direction 64, thus turning gears 47, 52, and 62 and rotating shaft 18 which turns in direction 68. The one-way ratchet 45 prevents gear 21 from rotating shaft 18 when turned in direction 65.

Figure 4:
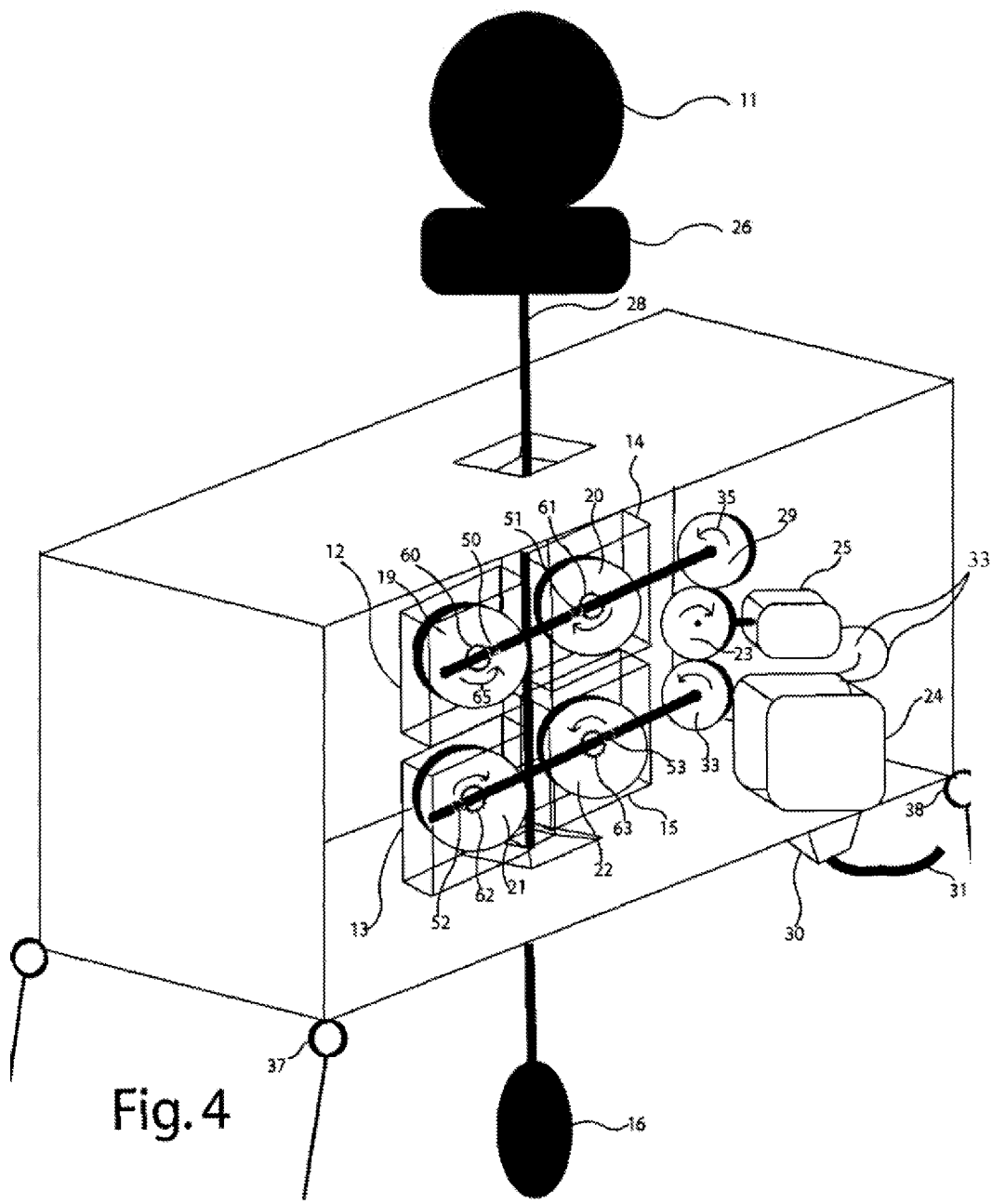
FIG. 4 shows a power generator according to a preferred embodiment of the invention.

FIG. 4 shows a plurality of watertight containers 12, 13, 14, and 15 which house the gears. The watertight gears drive the shaft on the inside of device 10. The entire unit is attached to the sea bed by cables attached to stainless steel rods that are driven into the sea floor.

What is claimed is:

1. A power generator comprising:
   a. a buoy disposed at the surface of an ocean;
   b. a weight disposed in said ocean;
   c. an electric generator comprising a stator and a rotor;
   d. a zip-line having a first end, a second end, and a plurality of line-teeth disposed in series between said first and second ends, wherein said first end of the zip-line is attached to said buoy and the second end of the zip-line is attached to said weight, wherein said weight is suspended below said buoy;
   e. a first gear disposed vertically between said buoy and said weight, said first gear comprising a first set of annularly disposed drive-teeth, wherein said first set of drive-teeth are mechanically meshed with said line-teeth, and a first ratchet disposed to substantially restrict rotation of said first gear to a first direction;
   f. a first drive mechanism comprising a first drive shaft having a first end coupled to said rotor and a second end coupled to said first gear such that the first drive mechanism places the first gear into mechanical communication with the electric generator;
   g. a second gear disposed vertically between said first gear and said weight, said second gear comprising a second set of annularly disposed drive-teeth, wherein said second set of drive-teeth are mechanically meshed with said line-teeth, and a second ratchet disposed to substantially restrict rotation of said first gear to a second direction, said second direction being opposite of said first direction;
   h. a second drive mechanism comprising a second drive shaft having a first end coupled to said rotor and a second end coupled to said second gear such that the second drive mechanism places the second gear into mechanical communication with the same electric generator as the first gear; and
   i. a flywheel in electric communication with said generator, wherein the buoy rises and falls with a passing wave such that only the first gear rotates in conjunction with the rise of the buoy and the second gear rotates in conjunction with the fall of the buoy.

2. The power generator of claim 1 wherein said zip-line, said first set of drive-teeth, and said second set of drive teeth are constructed of plastic.

3. The power generator of claim 1 wherein said zip-line, said first set of drive-teeth, and said second set of drive teeth are constructed of polytetrafluoroethylene-coated metal.

4. The power generator of claim 1 wherein said first end of said first drive shaft and said first end of said second drive shaft are mechanically coupled to said rotor.

5. The power generator of claim 1 wherein said first end of said first drive shaft and said first end of said second drive shaft are magnetically coupled to said rotor.

6. The power generator of claim 1 wherein said electric generator is suspended in said ocean between said buoy and said weight.

7. The power generator of claim 1 wherein said electric generator is fixed in said ocean between said buoy and said weight.

8. The power generator of claim 1 wherein said first gear and said second gear are disposed in watertight housings.

9. A method for generating electricity using a power generator according to claim 1.

10. The power generator of claim 1 wherein the flywheel and the electric generator are provided in a single housing.

11. The power generator of claim 1 wherein power generator is coupled to an ocean floor.

* * * * *